United States Patent [19]
Zucker

[11] Patent Number: 5,605,549
[45] Date of Patent: Feb. 25, 1997

[54] BATTERY ELECTROLYTE PAD WITH GELLING AGENTS AND METHOD

[75] Inventor: Jerry Zucker, Charleston, S.C.

[73] Assignee: Daramic, Inc., Burlington, Mass.

[21] Appl. No.: 608,152

[22] Filed: Feb. 28, 1996

[51] Int. Cl.$^6$ .................................................. H01M 4/64
[52] U.S. Cl. .................... 29/623.1; 429/139; 429/142; 429/144; 429/190; 429/191; 429/249; 429/251; 429/252
[58] Field of Search .................. 429/190, 129, 429/142, 249, 250, 252, 191, 134, 139, 144, 112, 116, 118; 29/623.1

[56] References Cited

U.S. PATENT DOCUMENTS 5,091,275  2/1992  Brecht et al. ............................ 429/247
5,180,647  1/1993  Rowland et al. ........................ 429/252
5,401,279  3/1995  Eisenhut et al. ....................... 29/623.5

*Primary Examiner*—M. Nuzzolillo
*Attorney, Agent, or Firm*—Juettner Pyle Lloyd & Piontek

[57] ABSTRACT

A gel-type storage battery is made by preparing porous electrolyte pads having internal pockets containing a dry powdered gelling agent, and inserting the pad between adjacent battery electrodes before addition of acid. The gelling agent may include acid resistant superabsorbing polymer particles, which cause the pads to swell into intimate contact with the electrodes upon addition of the aqueous acid.

14 Claims, 1 Drawing Sheet

BATTERY ELECTROLYTE PAD WITH GELLING AGENTS AND METHOD

BACKGROUND OF THE INVENTION

This invention relates to storage batteries having a gelled acid electrolyte and to a method for making such batteries.

Rechargeable batteries for vehicles and other uses comprise one or more cells having alternating positive and negative electrodes and an electrolyte. In a vehicle battery having sulfuric acid as the electrolyte, the acid may be converted to a colloid to provide a sealed battery. Conventional gel batteries include a microporous barrier between adjacent lead electrodes. Cooled battery acid is first mixed with a gelling agent, such as fumed silica, and is poured into the electrolyte cavities of the battery. The battery is then sealed and charged, with the acid being converted into a stable gel form.

While gel batteries described above enjoy widespread use, problems may arise during manufacture. Inadequate mixing of the gelling agent with the acid or premature gelling of the mixture may cause the formation of voids or air pockets in the electrolyte cavities of the battery. Also, inclusion of sufficient amounts of silica to form a stable gel, in the order of eight percent by weight of battery acid, in effect reduces the amount of available electrolyte in the battery.

SUMMARY OF THE INVENTION

In accordance with the present invention, a porous fabric pad is prepared with an acid gelling agent therein. The pad may be in the form of two or more layers of a nonwoven fabric having gelling agents sealed in closed pockets between the layers. The gelling agents may include conventional fumed silica particles but preferably comprise an acid resistant superabsorbing polymer or a mixture of such polymer and silica. The pad may be prepared by applying the gelling agent onto the surface of one layer of fabric, applying a second layer of fabric over the first, and then sealing the fabric layers together to define enclosed interior pockets containing the gelling agent uniformly distributed throughout the pad.

The composite pads may be manufactured on a continuous basis in roll form and later cut into rectangular pieces for insertion into the electrolyte cavity of a battery between adjacent positive and negative electrodes. Standard liquid battery acid is then added. Especially when the gelling agent comprises a superabsorbing polymer, the polymer causes rapid and uniform absorption of the acid to produce a uniform gel, free of voids. The use of a number of individual pockets in the pad allows for uniform distribution of the gelling agent and better circulation of the liquid acid upon addition. The uniform distribution also prevents settling of the gelling agent as well as gel blockage. The gel particles expand upon addition of acid, causing the pad to expand and completely fill the electrolyte space, with good contact with the electrodes.

The use of an acid resistant superabsorbing polymer as a gelling agent is especially beneficial because these polymers are capable of absorbing many times their weight of acid without being substantially chemically degraded, and thus a relatively small amount of polymer is required in comparison to conventional gelling agents such as silica.

The use of the preassembled pads greatly facilitates the production of a battery. The fabric envelope preferably comprises hydrophilic fibers, and in appropriate applications, serve to replace the microporous separators used in batteries of this type.

DESCRIPTION OF THE PREFERRED EMBODIMENT

Figure 1:
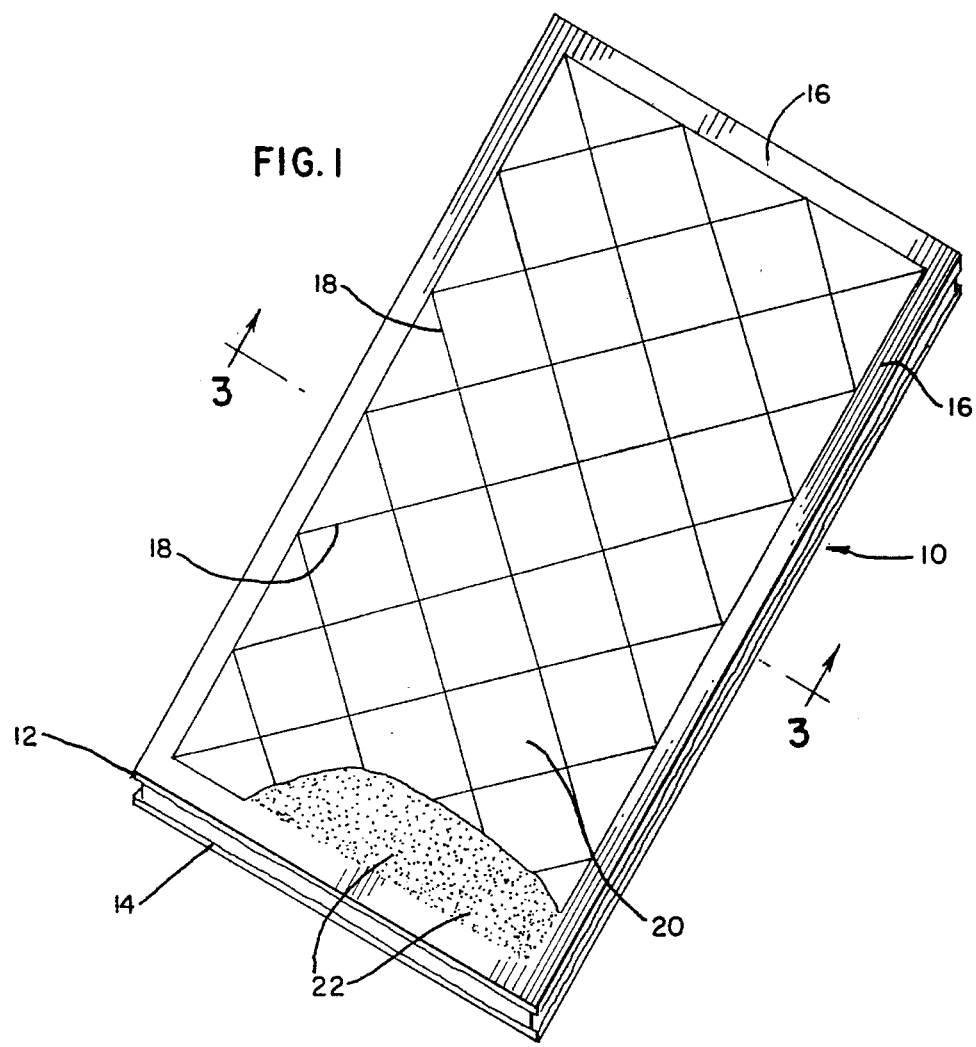
FIG. 1 is a perspective view of the battery pad of the present invention.
Figure 2:
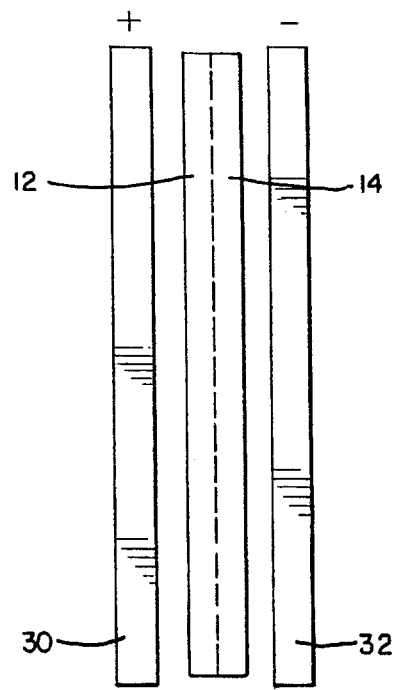
FIGS. 2 and 3 are schematic cross sectional views of a battery cell showing the relation of the battery pad with the electrodes before and after addition of acid.
Figure 3:
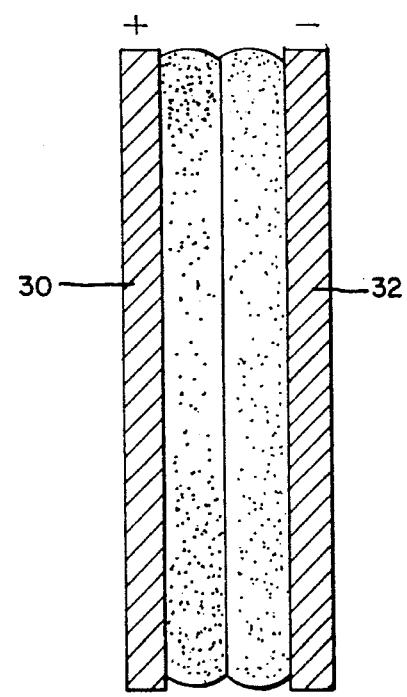

FIGS. 1–3 illustrate the battery pad 10 of the present invention, which comprises a pair of superimposed outer porous layers 12 and 14 which are sealed together around their outer margins 16 and at other locations, such as intersecting lines of seal 18 between the layers to define a plurality of interior sealed pockets 20 containing acid gelling particles 22 in dry powder form. The porous layers 12 and 14 may be sealed together by any conventional means, such as by passing a pair of superimposed webs of thermoplastic fibers between heated engraved rolls, by selective application of adhesive, by ultrasonic welding, and the like. A pad having a plurality of individual pockets is preferred in order to allow complete and rapid wicking and absorption of the liquid acid and to prevent formation of gel dams and air pockets.

The porous layers 12 and 14 are preferably composed of a nonwoven fabric made from polymeric fibers or filaments. The porous fabric is made from polymers which do not react with battery acid and are preferably hydrophilic, such as polyester. The fibers may also be of a polyolefin type, with the fibers being treated or having a known surface finish to render them more hydrophilic. A fabric of sufficiently low porosity is selected to retain the powder gel particles 22 between the fabric layers 12 and 14. The fabric layers may the same or different in terms of composition, weight per unit area, and porosity, depending on the final properties desired. In the alternative, the fabric layers may be composed of nonreactive porous fabrics of inorganic fibers, as well as porous or semiporous films.

The nonwoven polymer fabrics used herein are conventional in nature and may be formed by a variety of methods, such as by point bonding of dry thermoplastic fibers or filaments, by hydraulic entanglement of fibers, by melt blowing of filaments into the form of a sheet, and the like. Each outer layer may also comprise two or more separate fabric layers bonded together in order to control properties such as porosity, strength, ionic transfer, electrolyte absorption and other properties. The fabric layers prevent metallic particles from the electrodes from forming a bridge between the electrodes, which would result in a short circuit.

The area of the bonding between outer porous layers should not be so excessive as to prevent the later swelling of the pad upon addition of acid. Also, the fabrics employed must have sufficient elasticity to allow the ultimate swelling of the pockets in the pad without rupture.

The gelling particles may comprise conventional types, such as fumed silica but preferably comprise an acid resistant superabsorbing polymer. These polymers are available commercially and are based on polymers of acrylic acid. One suitable type is an acrylamide polymer with a cationic acid derivative, crosslinked. These polymers are capable of absorbing in excess of more than twenty-five times their own weight of battery acid, for example, a 20 to 50% concentration of sulfuric acid in water. The polymer particles expand substantially during formation of a stable gel or colloid.

The superabsorbing polymer ("SAP") may be employed as the sole gelling agent or may be admixed with other known gelling agents such as fumed silica. Fumed silica typically has a surface area in the order of 100 to 400 m²/g. The amount of SAP employed will generally be in the order of from about 0.5 to about 6 percent by weight of the acid, although up to 14 percent may be employed where future rehydration may be required. The inorganic gelling agents such as silica will generally be employed in the range of from about 5 to about 18 percent by weight of the acid, preferably with some or all of the silica being replaced by the SAP. The amount of gelling agent deployed in each pad, will be a fraction of the total amount required, depending on the number of electrolyte cavities in the battery.

The proportions of gelling agent may be easily adjusted per unit of volume or weight of battery acid to obtain the desired colloid structure. The addition of small amounts of SAP may significantly lower the amount of silica normally required to form a stable gel.

The dry pad 10 is inserted between adjacent electrodes 30 and 32 of a battery as shown in FIG. 2. When liquid acid is added, the SAP particles quickly form a colloid with the acid and swell, causing the pads to expand into a sealed and void free relation with the plate electrodes, as shown in FIG. 3.

The use of SAP particles together with silica is believed to be especially beneficial in that the SAP particles tend to rapidly absorb the liquid acid, holding individual silica particles apart, and promoting the rapid formation of a highly uniform and stable colloid or gel. The use of a prepackaged gelling agent also eliminates the need to provide an initial mixture of sulfuric acid and silica, which may not be uniform in nature.

While the electrolyte pad is shown as a rectangular for easy insertion and removal from a conventional rectangular battery case, other forms are easily envisioned. For example, the pad could be folded around an electrode plate before insertion into a battery casing, or it could be made in the form of a sleeve to surround the electrode on both sides.

Finally, while it is desirable to include powdered agents which swell upon addition of electrolyte or water, it is also possible to provide a pad of appropriate width that fits tightly between adjacent battery electrodes.

What is claimed is:

1. A storage battery comprising a pair of electrodes having a space therebetween, and an electrolyte pad within said space between said electrodes, said electrolyte pad comprising a pair of outer porous layers and a quantity of acid gelling agent distributed between said porous layers and sealed therebetween.

2. The battery of claim 1 wherein said acid gelling agent comprises a powdered acid resistant superabsorbing polymer.

3. The battery of claim 1 wherein said acid gelling agent comprises powdered silica.

4. The battery of claim 1 wherein said acid gelling agent comprises a mixture of superabsorbing polymer and silica.

5. The battery of claim 1 wherein said outer porous layers are sealed along lines to provide a plurality of enclosed pockets, and said acid gelling agent is a dry powder contained in said pockets.

6. The battery of claim 1 wherein said outer porous layers comprise nonwoven fabric.

7. The battery of claim 1 wherein said acid gelling agent and said electrolyte pad swell upon addition of acid and into contact with said electrodes.

8. The battery of claim 4 wherein said battery contains a weight of acid, and said acid gelling agent comprises from about 0.5 to about 14 percent by weight superabsorbing polymer and from about 5 to about 18 percent silica, based on the acid weight.

9. The battery of claim 2 wherein said superabsorbing polymer is an acrylic polymer.

10. A gel type acid storage battery comprising a pair of spaced electrodes and an electrolyte pad between said electrodes, said pad comprising a pair of outer superimposed porous fabric layers, a plurality of closed pockets between said fabric layers, and a quantity of powdered acid gelling agent in said pockets.

11. A method of making a battery comprising the steps of providing a battery structure having adjacent positive and negative electrodes and a space therebetween, fabricating a porous pad having outer powder layers and a quantity of acid gelling agent between said porous layers in dry particulate form, inserting said pad into said space, and adding liquid acid to said space whereby to form a gel between said acid and said gelling agent.

12. The method of claim 11 wherein said gelling agent comprises a superabsorbing polymer.

13. The method of claim 11 wherein said outer porous layers comprise nonwoven fabric.

14. The method of claim 11 wherein said pad expands and comes into firm contact with said electrodes upon formation of said gel.

\* \* \* \* \*